United States Patent [19]

Okamoto et al.

[11] Patent Number: 4,855,661
[45] Date of Patent: Aug. 8, 1989

[54] MOTION CONTROL APPARATUS FOR INDUCTION MOTOR

[75] Inventors: Kiyokazu Okamoto; Kiyoshi Hino; Kosuke Kaito, all of Tokyo, Japan

[73] Assignee: NEC Corporation, Japan

[21] Appl. No.: 35,611

[22] Filed: Apr. 7, 1987

[30] Foreign Application Priority Data

Apr. 11, 1986 [JP] Japan .................................. 61-83849

[51] Int. Cl.$^4$ ............................................. H02P 5/40
[52] U.S. Cl. .................................... 318/807; 318/800
[58] Field of Search ................ 187/119; 318/803, 805, 318/807-811, 800

[56] References Cited

U.S. PATENT DOCUMENTS 4,483,419 11/1984 Salihi et al. ......................... 318/759
4,501,343 2/1985 Salihi ................................. 318/803

Primary Examiner—David Smith, Jr.
Attorney, Agent, or Firm—Ostrolenk, Faber, Gerb & Soffen

[57] ABSTRACT

In a motion control apparatus for an induction motor, an inclination of acceleration/deceleration curve representing an increase/decrease per unit time in rotation speed of the induction motor is changed in accordance with the value of an angular frequency $\omega s$ corresponding to a slip speed of the induction motor.

3 Claims, 10 Drawing Sheets

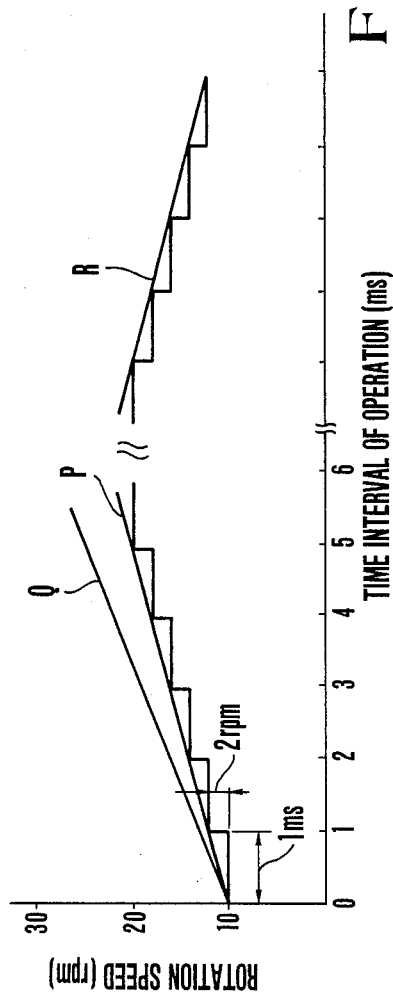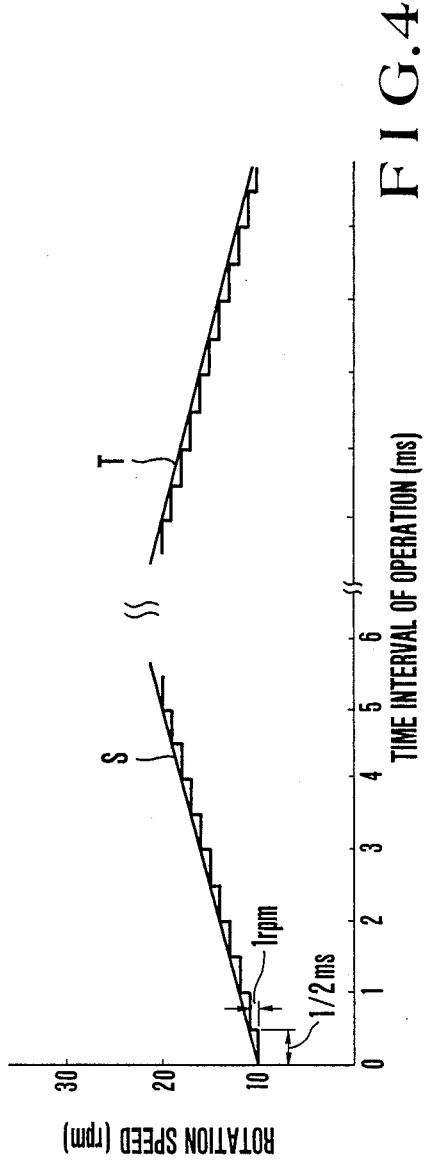

MOTION CONTROL APPARATUS FOR INDUCTION MOTOR

BACKGROUND OF THE INVENTION

The present invention relates to a motion control apparatus for an induction motor and, more particularly, to a motion control apparatus for an induction motor which utilizes slip speed to suppress excessively quick acceleration and deceleration of the induction motor.

Induction motors have been widely used in various applications as constant speed motor or as constant frequency power sources by utilizing their inherent rigid structure, low cost, and the like.

However, the induction motor has not been used as a servo motor because it cannot provide quick acceleration and deceleration.

Due to recent improvements of electronic devices, microcomputers, and software techniques, a vector control technique that can change the frequency of a power source for driving the induction motor over a wide range is realized, and the induction motor itself is also improved. As a result, the induction motor may be used as the servo motor.

Such a variable frequency power source is operated by a vector control process described in, e.g., "New Drive Electronis", written by Naohiko Kamiyama, Denki Shoin (to be referred to as Literature 1 hereinafter).

The aforementioned Literature 1 includes a section which will said in the understanding of the present invention and which essentially reads as follows.

6.2.4 Slip-frequency type vector control

In the slip-frequency type vector control, a flux-component current and a torque-component current are determined as values in secondary-flux coordinates, and these currents are converted into primary current values in stationary coordinates without detection of any secondary-flux vector. A slip frequency depending upon the flux-component and torque-component currents is calculated using a motor constant. The slip frequency thus calculated and a rotating speed are added together to determine a rotating speed of the secondary flux. A position determined through differentiation of the rotating speed of the secondary flux is used as an estimated position of the secondary flux in the coordinate conversion. A motor speed is supplied as a quantity of state of an induction motor to the control circuit in which it is added to the slip frequency. However, any quantity concerning the secondary flux is not supplied to the control circuit. The flux is not subject to any feedback control, but it is determined as directly calculated as a first order lead from a secondary flux command in such a manner as to compensate a first order lag response of the secondary flux with respect to the flux-component current. The slip-frequency type vector control is a kind of predictor control in which the flux vector is controlled through estimation by calculation.

Also in the slip-frequency control, it was tried to control the flux and vector by relating the magnitude of the primary current with the slip frequency. However, the primary current was not handled as a vector and only the magnitude of the current was controlled. When the induction motor is operated from commercial power, the power factor changes while the motor is connected with a load, and the primary current shifts in phase. In the slip-frequency control, since the frequency of the primary current is controlled by a power inverter, the primary current will not shift in phase even when the motor is connected with no load or even at the torque output form the motor. Because the steady-state power factor must be equal in both the above-mentioned cases, the phase of voltage shifts eventually. The phase variation of the voltage can be regarded as the phase shift or flux. Because of this phase variation, the real slip frequency being the speed at which a secondary conductor interlinks the flux is different from the slip frequency provided by the control. Thus, the flux and torque incur complicated transient phenomena so that any control faster than the secondary time constant $L2/R2$ at which the phenomena are attenuated cannot be done. Namely, the consideration of the phase shift of the primary current due to the torque state is a development to the slip-frequency type vector control. In the torque control by supplying an exciting current at a frequency controlled with a slip frequency, the phase shift of a current developed by synthesis from the exciting current and a current having a 90-degree difference from the exciting current is selected to be equal to the phase shift of current created by the induction motor in the steady state by giving a slip frequency. When the primary current varies in phase, a current which cancels such shift flows momentarily through the secondary conductor so that the induction motor can be shifted to a new steady state momentarily. The power inverter must not only control the frequency but the phase.

The slip-frequency type vector control may be considered to be the above-mentioned concept in which the secondary flux is introduced taking account of the influence of leakage inductance and which is further extended to the change of the secondary flux.

The basic configuration of the slip-frequency type vector control is shown in FIG. 11 (FIG. 1 of the present invention.) The output from the speed control amplifier is handled as a torque command TM*. The torque command TM* is divided by a secondary flux command $\phi 2^*$ to provide a secondary q-axis current command $-i2q^*$. This is further multiplied by $L2/M$ by the scale-factor element to be a torque-component current command ilq*. Since no secondary flux has been detected, the above is the same as the flux-detection type vector control except for the division by the command $\phi 2^*$.

The flux-component current command ild* is determined directly from the secondary flux command $\phi 2^*$. For compensation of the follow-up of the secondary flux with the flux-component current with first order lag, a sum ild* of a current exciting a secondary flux resulted from multiplication of $\phi 2^*$ by $1/M$ and a current forcing a secondary flux proportional with a time change rate of $\phi 2^*$ is determined. In case the field system of direct-current motor is controlled, a voltage proportional with the change rate of field current develops across the field inductance. This voltage is necessary in a more quantity as forcing voltage than the steady-state voltage. The forcing current plays a same role as the forcing voltage. To indirectly control the secondary flux in the slip-frequency type vector control, a forcing voltage has to be developed in the secondary winding. This forcing voltage is developed by supplying a forcing current to the secondary resistor. In the flux-detection type vector control, the forcing voltage is developed by the feedback control as in the control of the field current in the direct current monitor.

A slip frequency command $\omega_s^*$ is calculated from $\phi 2^*$ and $-i2q^*$. A speed $\omega_r$ from the speed detector and $\omega_s^*$ are added together to determine a speed $\omega_o^*$ of the secondary flux which is supplied to the vector oscillator which generates a unit vector $e^{j\theta o^*}$ indicative of a predicted position $\theta o^*$ ($=\int\omega o^* dt$) of the secondary flux.

The primary current vector $il^*$ ($\theta o^*$) in the secondary-flux coordinates is determined depending upon the torque-component current and flux-component circuit command values. This primary current vector is multiplied by the unit vector $e^{j\theta o^*}$ in the vector multiplier and converted into a primary current vector $il^*$ in the stationary coordinates. Further, it is converted into current commands $iU^*$, $iV^*$ and $iW^*$ through the three-phase conversion. Thus, the power inverter is controlled by this current control loop.

The slip-frequency type vector control needs and induction motor constant for calculation of a flux-component current and slip frequency. Unless the constant is correctly set, torques and secondary fluxes according to the respect commands will not result, but they need not to be in strict accordance with the commands. A transient phenomenon will appear corresponding to an error in the constant, but the induction motor constant may be set for the error not to be any problem in practice. It will be necessary for an intended purpose to use for the factor 1/M of an exciting current for the secondary flux command a function for which the saturation of the induction motor is taken in account or to compensate the change of the secondary resistor due to any temperature change from the change of the terminal voltage, etc.

The slip-frequency type vector control needs not any special induction motor, and can be made highly accurate only through the calculation in the control circuit.

The conventional so-called "slip-frequency vector control" described in FIG. 6.35 in the Literature 1 will be described hereinafter with reference to FIG. 1.

In the basic arrangement of slip-frequency vector control shown in FIG. 1, reference numeral 101 denotes a speed control amplifier; 102, a divider; 103, a constant setting device; 104, a vector analyzer; 105, a multiplier; 106, a converter; 107, a current control amplifier; 108, a power converter; 109, Induction motors have; 111, a speed detector; 112, differentiator; 113, 114, 115, and 116, constant setting devices; 117, a divider; 118, a vector oscillator; and 119, an adder.

With this arrangement, a torque can be controlled in accordance with a change in instantaneous current that changes over time. Refer to Chapter 6.2.1 in the Literature 1 for the detailed arrangement and operation of slip-speed vector control.

Even in slip-speed vector control having the basic arrangement as shown in FIG. 1, if this arrangement is applied to a servo motor without modification, excessively quick acceleration and deceleration occur, and an excessive current may flow. Even if a primary current of the induction motor is increased, its torque cannot be increased, i.e., a so-called stall state may occur.

SUMMARY OF THE INVENTION

It is an object of the present invention to provide a motion control apparatus for an induction motor, which is free from the above drawbacks.

A motion control apparatus for an induction motor, according to the present invention, comprises a means for changing an inclination of an acceleration/deceleration curve indicating an increase/decrease per unit time in rotation speed of an induction motor, in accordance with a value of an angular frequency $\omega s$ corresponding to a slip speed of the induction motor.

More particularly, the motion control apparatus comprises means for generating first serial pulses which command a change in the rotation positional of the induction motor; means for generating second serial pulses which pick up a change of the rotation speed of the induction motor; droop counter means for accumulating the first and second serial pulses to continuously obtain a difference between an instructed position and an actual position detected; means for obtaining an actual speed on the basis of a difference between of the second serial pulses; means responsive to the actual speed for reading out an allowance slip speed $|\omega_s'|$ registered in advance; means for generating a torque instruction signal on the basis an output of the droop counter means and the actual speed; means for continuously obtaining a slip speed $|\omega_s|$ by using the torque instruction signal, the actual speed and constants in an equivalent circuit of said induction motor; means for comparing the $|\omega_s'|$ and the $|\omega_s|$ to control the generating means of the first serial pulses such that, when $|\omega_s'| \geq |\omega_s|$, the first serial pulses are generated in accordance with a inclination of a pre-selected acceleration/deceleration curve and, when $|\omega_s'| \geq |\omega_s|$, the first serial pulses are generated so as to decrease or nullify the inclination of the acceleration/deceleration curve.

BRIEF DESCRIPTION OF THE DRAWINGS

FIGS. 3 and 4 are diagrams for explaining two modes of the apparatus shown in FIG. 2;

DETAILED DESCRIPTION OF THE PREFERRED EMBODIMENT

An embodiment of a motion control apparatus for an induction motor according to the present invention will now be described with reference to the accompanying drawings.

Figure 1:
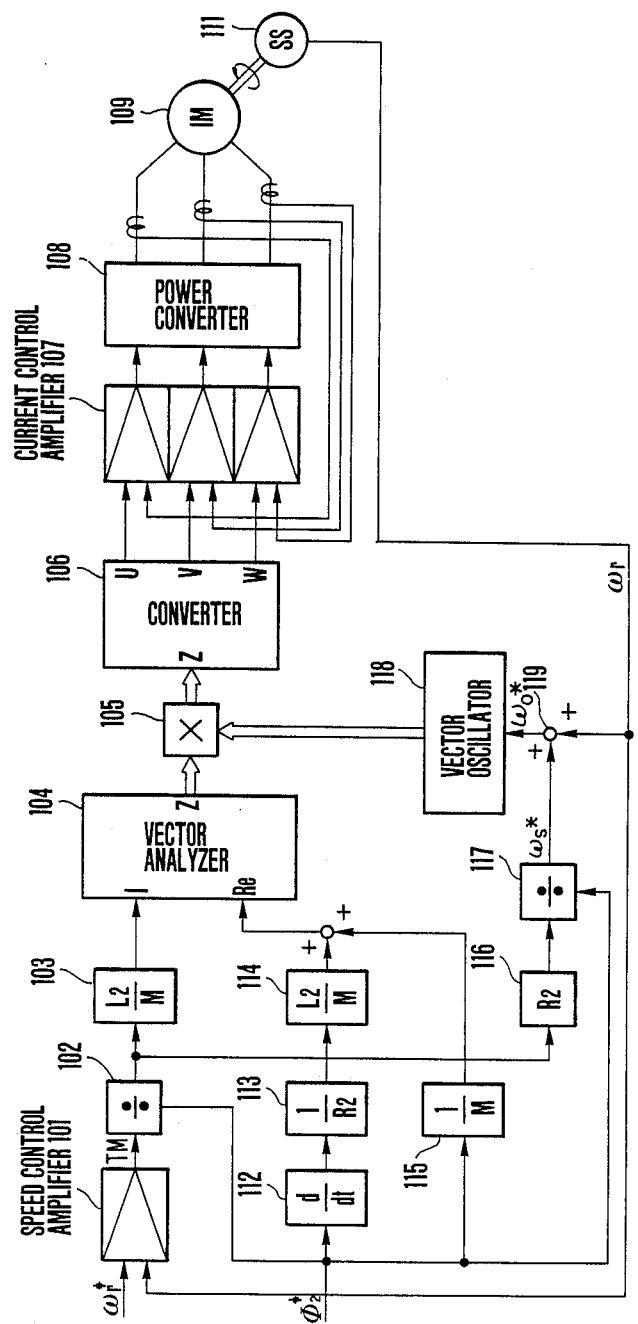
FIG. 1 is a block diagram showing a basic arrangement of conventional slip-frequency vector control.
Figures 2, 2A:
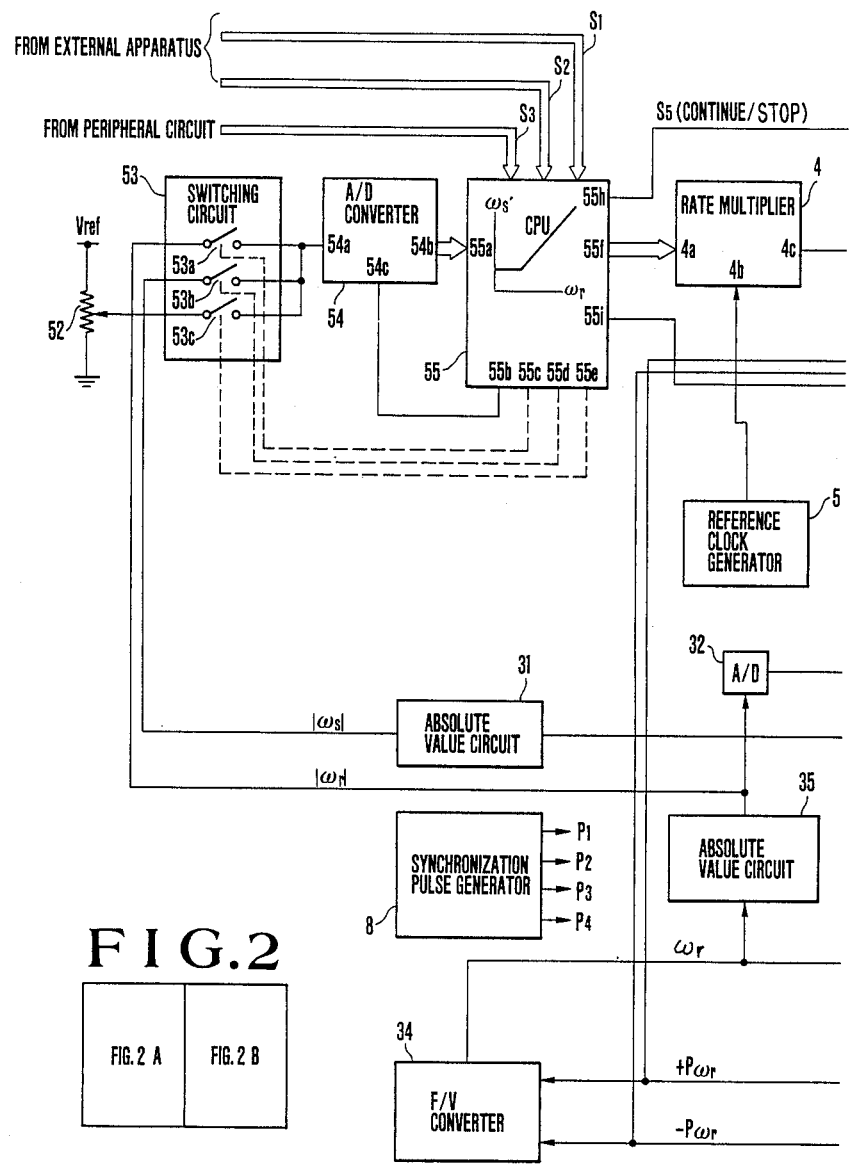
FIG. 2 is a circuit diagram of a motion control apparatus for an induction motor, according to the present invention.
Figure 2B:
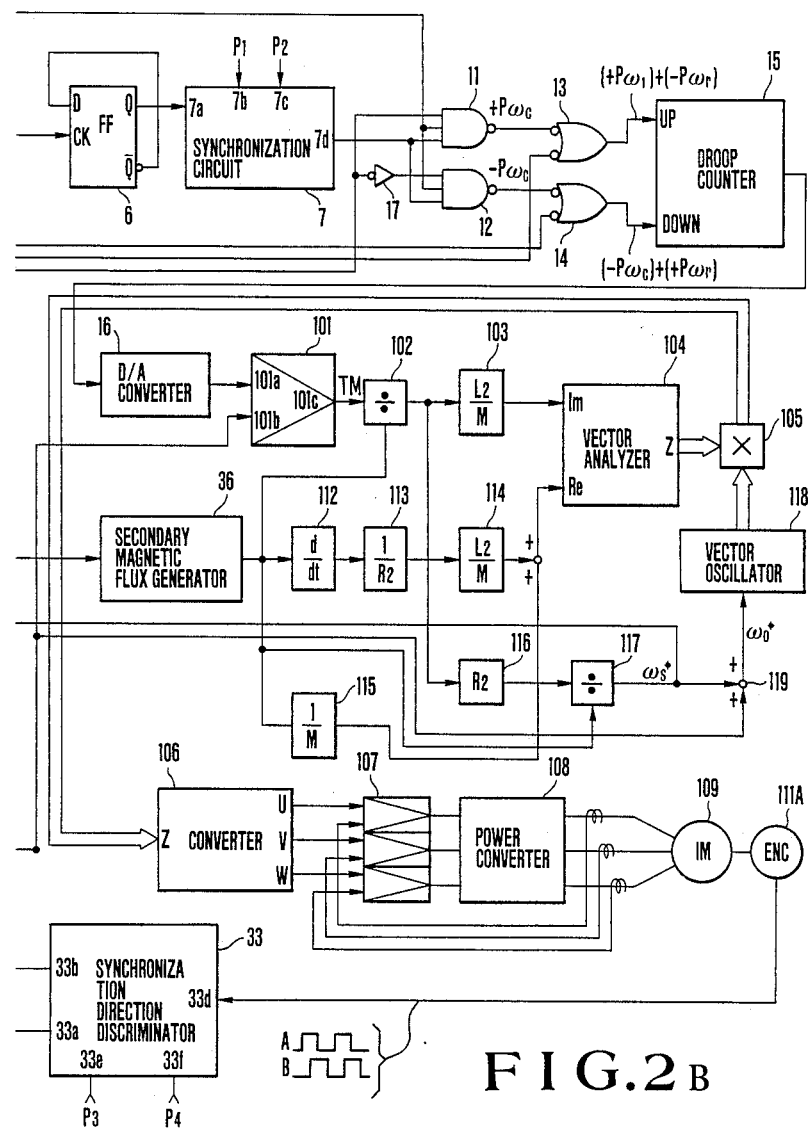

FIG. 2 is a circuit diagram showing a motion control apparatus for an induction motor, according to the present invention. Note that the same reference numerals in FIG. 2 denote the same parts as in FIG. 1, and a detailed description thereof will be omitted.

Referring to FIG. 2, a central processing unit (to be referred to as a CPU hereinafter) 55 comprising, e.g., a microcomputer, receives: a k-bit (k is an arbitrary constant) speed instruction Sl, supplied from an external apparatus (not shown, for example, an NC apparatus) including an induction motor according to the present invention, for indicating, e.g., the rotation speed of the induction motor (e.g., 1,000 rpm), a control signal S2, supplied from the external apparatus, and various abnormality signals S3 from peripheral circuits (not shown). The control signal S2 includes a signal (speed-up/slow-down signal) capable of instructing whether or not a speed-up/slow-down operation that can allow the rotation speed of the induction motor to be gradually increased or decreased is performed, and a signal (rotation direction signal) capable of instructing whether the induction motor is rotated in the normal or reverse direction.

The rotation speed of the output shaft of the induction motor 109 is detected by a pulse encoder 111A. An output $\omega r$ from the pulse encoder 111A is supplied to an absolute value circuit 35 through a synchronization direction discriminator 33 and an F/V (Frequency-to-Voltage) converter 34, and is converted to an actual speed $|\omega r|$, and the actual speed $|\omega r|$ is input to the input terminal of a switch 53a of a switch circuit 53. As in the circuit shown in FIG. 1, a torque instruction is calculated from the actual angular velocity $\omega r$, as the pulse encoder output, and an instructed angular velocity $\omega w^*$ which is output of the D/A converter 16 in FIG. 2. The torque instruction is converted to an absolute value $|\omega s|$ through the divider 102, the constant setting devices 116 and 117 and an absolute value circuit 31, and the slip speed $|\omega s|$ is input to the input terminal of a switch 53b of the switch circuit 53. The input terminal of a switch 53c of the switch circuit 53 is connected to the slider terminal of a variable resistor 52. One end of the variable resistor 52 is connected to a terminal for supplying a reference voltage Vref, and the other end thereof is grounded. As will be described later, the variable resistor 52 controls an inclination of speed-up and slow-down operation curve of the rotation speed of the induction motor.

The output terminals of the switches 53a, 53b, and 53c of the switch circuit 53 are commonly connected to an input terminal 54a of an A/D converter 54. A digital data output terminal 54b of the A/D converter 54 is connected to an input port 55a of the CPU 55.

An output terminal 55b of the CPU 55 is connected to a control terminal 54c of the A/D converter 54, and an A/D conversion instruction is output therefrom. Output terminals 55c, 55d, and 55e are respectively connected to the switches 53a, 53b, and 53c of the switch circuit 53, so as to control them using switching signals.

An output port 55f of the CPU 55 is connected to an input terminal 4a of a rate multiplier 4 which can convert the frequency of a reference clock to a predetermined frequency (to be described next). An input terminal 4b of the rate multiplier 4 is connected, through one input terminal of an AND gate 10, to the output terminal of a reference clock generator 5 for generating the reference clock having a frequency of, e.g., 4 MHz. The other input terminal of the AND gate 10 is connected to an output terminal 55g of the CPU 55, and supplies a signal as a second means for controlling whether or not the operation of the induction motor is continued or suppressed, as will be described later.

An output terminal 4c of the rate multiplier 4 is connected to a clock terminal CK of a D flip-flop 6. The Q output terminal of the D flip-flop 6, for improving a duty ratio, is connected to an input terminal 7a of a synchronization circuit 7 for obtaining a timing allowing a droop counter 15 to be normally operated. Input terminals 7b and 7c of the synchronization circuit 7 respectively receive pulses P1 and P2 from a synchronization pulse generator 8. These pulses P1 and P2 serve as synchronization signals for preventing "overlapping" with an output signal ($\pm P\omega r$) from the synchronization direction discriminator 33 (to be described later).

An output terminal 7d of the synchronization circuit 7 is connected to the first input terminals of 3-input NAND gates 11 and 12, respectively. The output terminals of the NAND gates 11 and 12 output serial pulses indicating an instructed speed $P\omega c$ for instructing the rotation speed of the induction motor (to be described later). The second input terminals of the 3-input NAND gates 11 and 12 are connected to an output, terminal 55h of the CPU 55. The output terminal 55h of the CPU 55 outputs a signal as a stop means for controlling whether the operation of the induction motor is continued or stopped, as will be described later. The third input terminals of the NAND gates 11 and 12 are connected to an output terminal 55i of the CPU 55 with or without passing through an inverter 17. The output terminals of the NAND gates 11 and 12 are respectively connected to one input terminals of negative logic OR gates 13 and 14. The output terminals of the OR gates 13 and 14 are connected to input terminals UP and DOWN of the droop counter 15.

The droop counter 15 comprises a normal up-down counter, and calculates a difference between an instructed position of the rotor of the induction motor and its actual position. This difference corresponds to a "delay in position" of the rotor, and the "delay in position" serves as the above-mentioned speed instruction for instructing the rotation speed of the induction motor.

The output terminal of the droop counter 15 is connected to the input terminal of a D/A converter 16. The output terminal of the D/A converter 16 is connected to an input terminal 101a of a speed control amplifier 101. More specifically, the speed control amplifier 101 receives the "delay in position" as an analog value. The output terminal of the speed control amplifier 101 is connected to a slip speed control apparatus of slip-frequency vector control type, as shown in FIG. 1.

Two-phase pulse signals A and B whose phases are shifted by 90° from the actual speed $\omega r$ are output from the output terminal of the pulse encoder 111A, and are input to an input terminal 33d of the synchronization direction discriminator 33. The synchronization direction discriminator 33 discriminates the rotation direction of the induction motor 109 in accordance with the two-phase pulse signals A and B, and supplies, to the F/V converter 34, a serial pulse signal $\pm P\omega r$ indicating the actual speed $\omega r$ of the induction motor 109. The discriminator 33 also supplies the pulse signal $\pm P\omega r$ to the other input terminals of the negative logic OR gates 13 and 14.

The $+P\omega r$ signal is a signal representing the normal rotation of the induction motor 109, and the $-P\omega r$ signal is a signal representing the reverse rotation of the induction motor 109. Input terminals 33e and 33f of the synchronization direction discriminator 33 receive pulses P3 and P4 from the synchronization pulse generator 8. These pulses P3 and P4 cause the actual speed $P\omega r$ and the instructed speed $P\omega c$ not to overlap each other.

The output terminal of the F/V converter 34 is connected to the input terminal of the absolute value circuit 35, an input terminal 33c of the synchronization direction discriminator 33, an input terminal 101b of the speed control amplifier 101, and one input terminal of the adder 119. The output terminal of the A/D converter 32 is connected to the input terminal of a secondary magnetic flux generator 36 for energizing the induction motor 109. The generator 36 applies a secondary magnetic flux $\Phi_2^*$ to the vector control circuit shown in FIG. 1. The output from the F/V converter 34 is added to the output ($\omega s^*$) from the divider 117 to calculate the speed $\omega_O^*$, and the speed $\omega_O^*$ is applied to the vector oscillator 118.

A signal for instructing whether the rotation of the induction motor is to be continued or suppressed includes the first, second and third means as described above. However, the first to third means need not be simultaneously used. For example, if the first means is used, the signals S4 and S5 need not be output from the output terminals 55g and 55h of the CPU 55, respectively. In this case, the second and third input terminals of the 3-input NAND gates 11 and 12 can be connected.

The operation mode of the motion control apparatus for the induction motor, having the arrangement as shown in FIG. 2, will be described with reference to FIGS. 3 and 4.

FIG. 3 is a diagram showing the first operation mode. A line P in FIG. 3 represents a case wherein the time interval of operation plotted along the abscissa is fixed to be 1 ms, and the rotation speed of the induction motor plotted along the ordinate is increased by 2 rpm during the unit time interval of 1 ms. In this case, after the lapse of 2 ms, the rotation speed reaches 4 rpm, and after the lapse of 3 ms, it reaches 6 rpm. In the case of the line P, the rotation speed of the induction motor is gradually increased at a constant rate of acceleration, and will not adversely influence an external portion due to an abrupt change.

The line P determines an increase in rotation speed to be 2 rpm with respect to the unit time interval of 1 ms. For example, "n rpm (setting value)"(where n is an arbitrary constant) can be set with respect to 1 ms (fixed value). A line Q represents a case wherein n=3 rpm. Contrary to the above, a line R represents a deceleration state wherein the rotation speed is decreased by 2 rpm after lapse of every 1 ms. That is, the line R represents a linear deceleration state contrary to the linear acceleration state described above. In the linear deceleration state, the output shaft of the induction motor will not be abruptly moved with respect to the external portion. Therefore, a very smooth deceleration motion can be maintained.

FIG. 4 shows the operation mode wherein the rotation speed plotted along the ordinate is fixed and the time interval plotted along the abscissa is variable. Referring to FIG. 4, a line S represents a case wherein the step of the rotation speed is fixed to be 1 rpm, and the time interval is variable in units of ½ ms. In this case, since a linear function can also be obtained, the rotation speed of the induction motor is gradually increased, and its output shaft will not apply a varied force to an external portion. In this mode, a line T represents a deceleration state.

In order to determine the inclination of the lines P, Q, R, S, and T shown in FIGS. 3 and 4, an interval (a speed change per unit time) of the ordinate (acceleration/deceleration value axis) and the abscissa (time base) can be determined in both the modes shown in FIGS. 3 and 4.

This interval can be determined by adjusting the variable resistor 52 in the circuit shown in FIG. 2. More specifically, the reference voltage Vref is voltage-divided, and the divided voltage is supplied to the CPU 55 through the switch 53c of the switch circuit 53 and the A/D converter 54. Then, the CPU 55 selects a value corresponding to the input voltage from a prestored data table and determines the interval.

The operation of the first mode (FIG. 3) of the motion control apparatus for the induction motor, shown in FIG. 2, which is operated based on the principle described above, will be described with reference to FIGS. 5, 6, 7, and 8.

Figure 5:
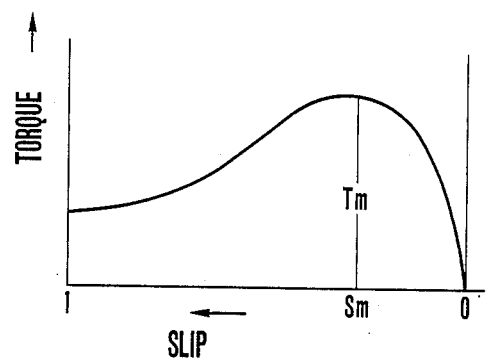
FIG. 5 is a graph showing an operating curve of the induction motor.
Figure 6:
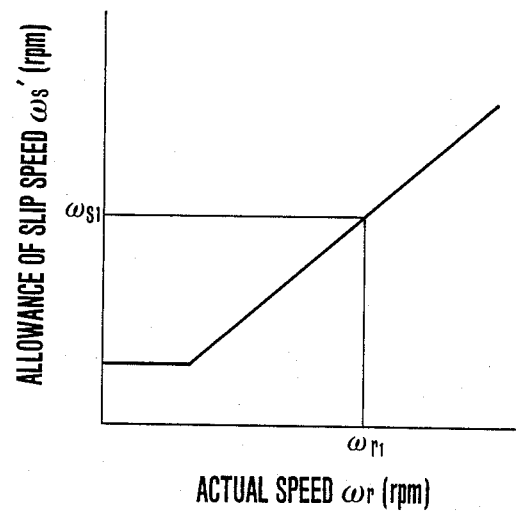
FIG. 6 is a diagram for explaining speed control of the apparatus of the present invention.

The known relationship between slip speed and torque of the induction motor is as shown in FIG. 5. More specifically, if the slip speed is "0", the torque is "0". As the slip speed increases, the torque is quickly increased. When the slip speed corresponding to a maximum torque Tm is given as Sm, if the slip speed increases exceeding Sm, the torque is gradually decreased. Therefore, as can be seen from FIG. 5, the rotation speed of the induction motor can be controlled during an interval from when the slip speed is "0" until it reaches the maximum value Sm. A practical control range is thus limited to a narrow range from the speed "0".

When the slip speed exceeds the maximum value Sm, this causes a state wherein speed control is disabled, i.e., a step-out state, and the rotation speed of the induction motor cannot be controlled. More specifically, in order to perform speed control of the induction motor, the actual speed $\omega r$ of the induction motor is always monitored, and the slip speed $\omega s$ must be controlled to be smaller than a given value (e.g., smaller than Sm in FIG. 5). For this purpose, the characteristic of the actual slip speed $\omega s$ with respect to the allowance or allowable value $\omega s'$ of the slip speed $\omega s$ shown in FIG. 6 can be stored in a memory (PROM) of the CPU 55, and the slip speed is controlled in accordance with this characteristic.

As for the characteristic of the actual speed $\omega r$ with respect to the allowance $\omega s'$ of the slip speed $\omega s$, a data table which can always provide, e.g., a slip speed $\omega s1$ when the actual speed is $\omega r1$, is prepared, and the slip speed $\omega s1$ is set to fall in a control range (outside a stall area) of the torque curve shown in FIG. 5.

Figure 7:
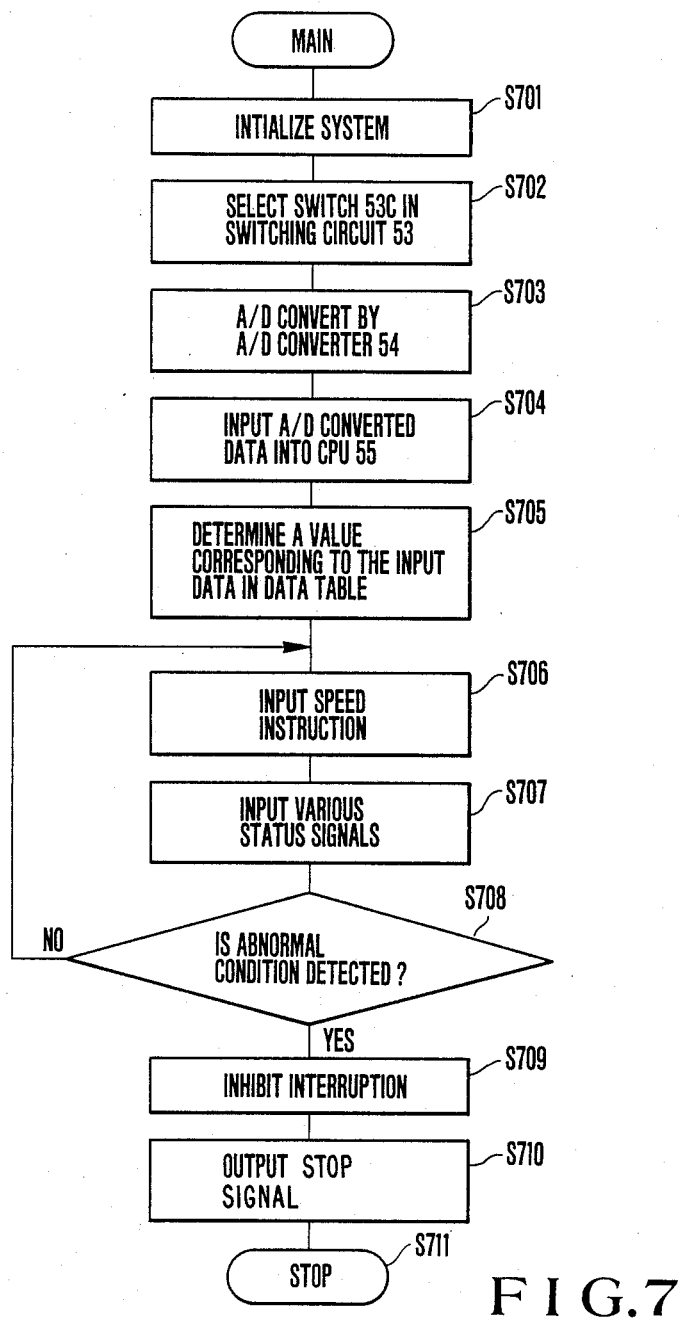
FIGS. 7 and 8 are flow charts for explaining an and operation of first and second modes of the apparatus shown in FIG. 2.
Figure 8:
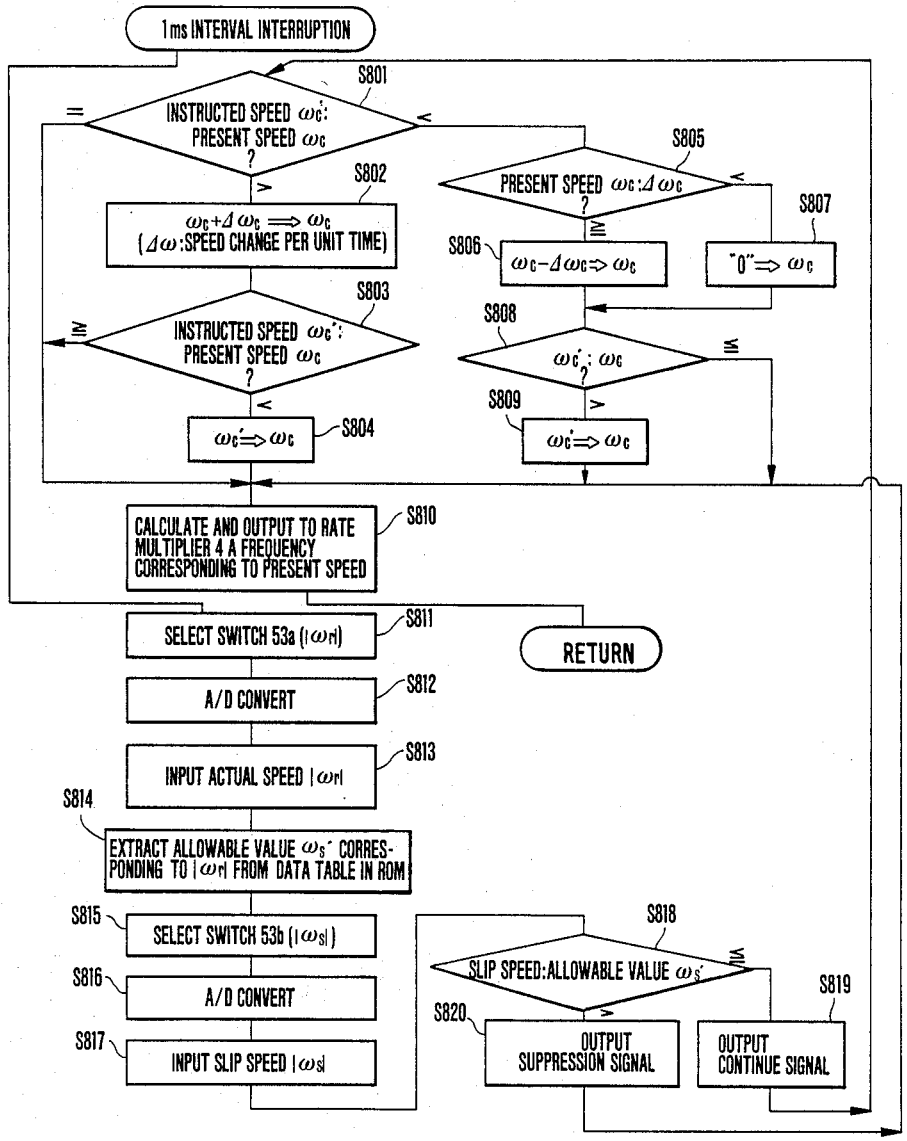
Figure 9:
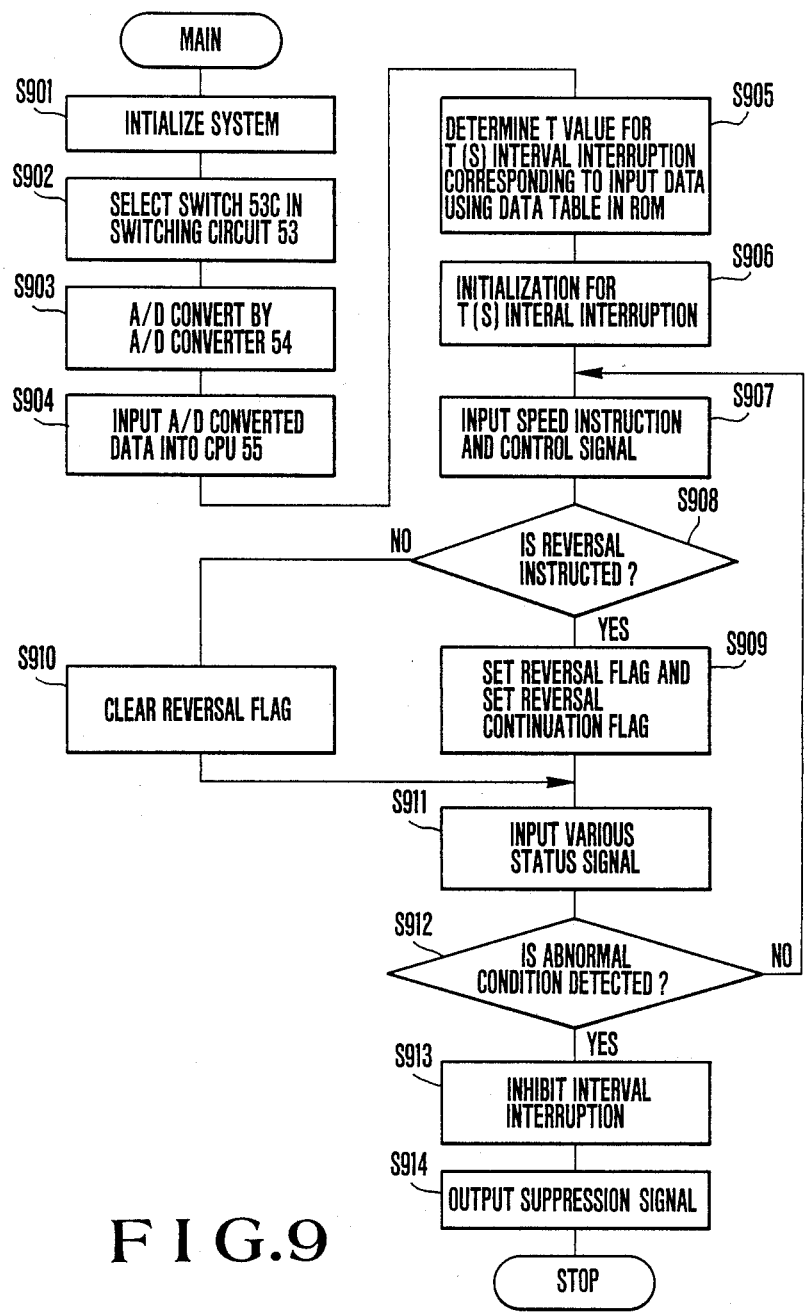
Figure 10:
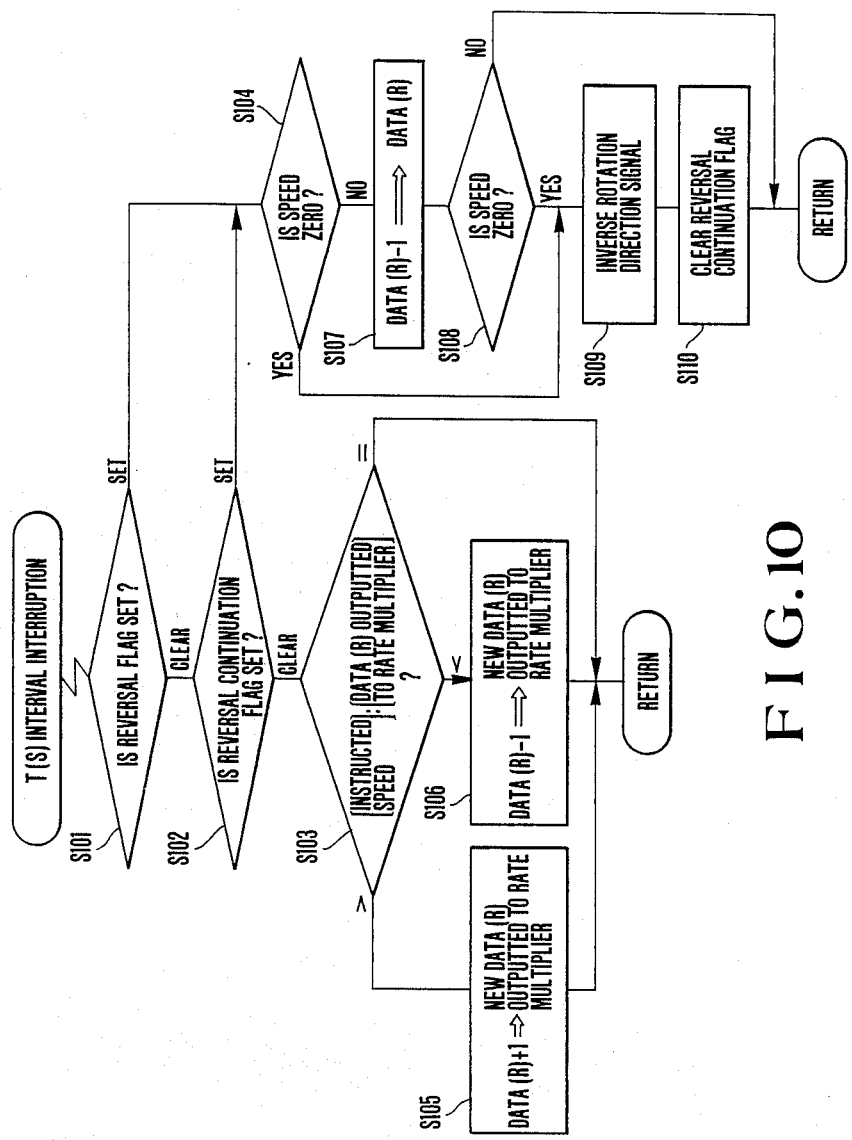
Figure 11:
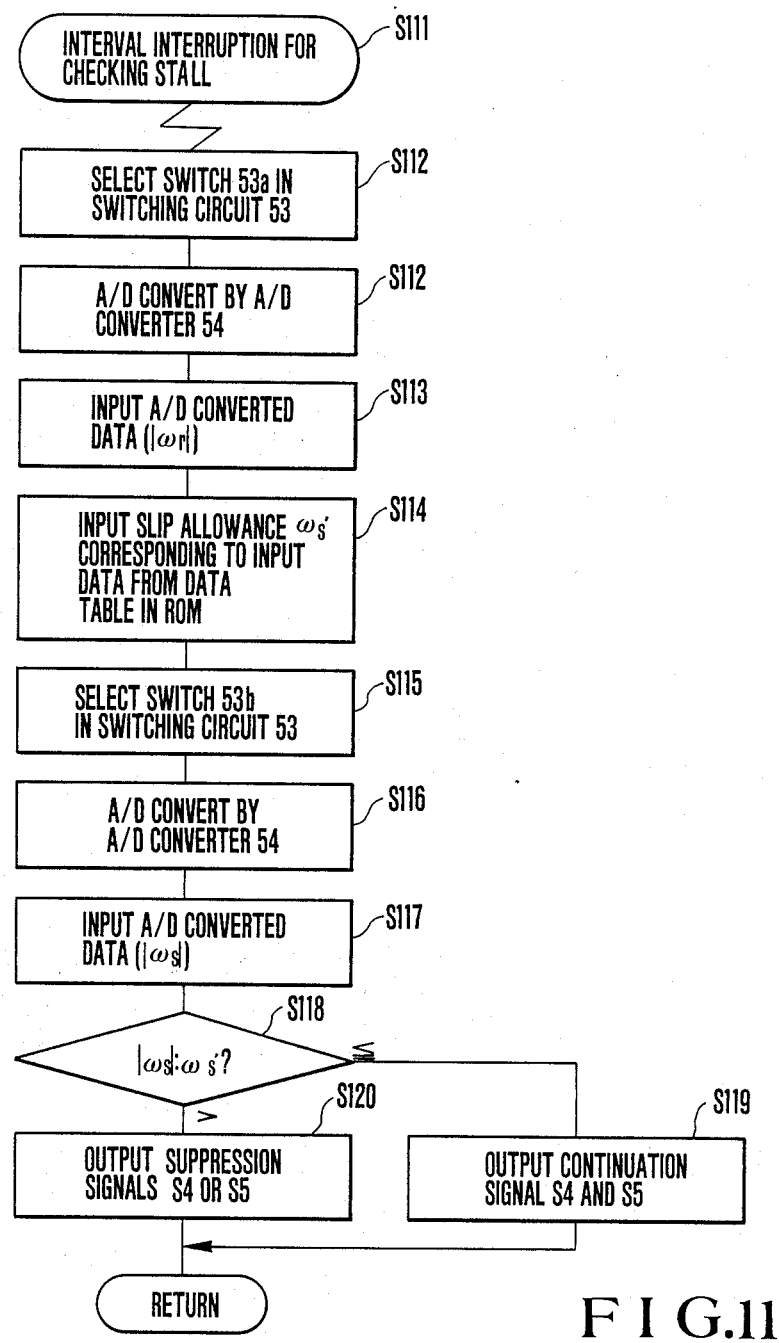

FIG. 7 is a main flow chart, and FIG. 8 is a flow chart of an interruption that is performed at equal intervals during the execution of the main flow chart shown in FIG. 7.

In the flow chart shown in FIG. 7, after the system is initialized in step 701, the reference voltage Vref is voltage-divided by the variable resistor 52. The divided voltage is supplied to the A/D converter 54 through the switch 53c of the switch circuit 53 (step 702). In step 703, the divided voltage is converted to a digital signal by the A/D converter 54, and the digital signal is supplied to the CPU 55 in step 704. In step 705, a speed change per unit time corresponding to the input data is determined from the data table prepared in the CPU 55. More specifically, data for selecting a change along the ordinate of FIG. 3 for determining the inclination of slow-up or slow-down operation curve of the rotation of the induction motor in accordance with the divided voltage from the variable resistor 52, is selected. In steps 706 and 707, the CPU 55 receives a speed instruction from an external apparatus and various status signals from peripheral circuits, and in step 708, the CPU 55 checks various abnormality signals. If an abnormal condition is detected, the flow advances to step 709 to perform abnormal condition processing, and the interruption is inhibited, so as not to perform processing disregarding the detected abnormal condition. In step 710, one of suppression signals is output to stop the rotation of the motor. If no abnormal condition is detected in step 708, the operations in steps 706 and 707 are repeated.

While the operations in steps 706, 707, and 708 are repeated, the 1-ms interval interruption shown in FIG. 8 is performed.

Referring to FIG. 8, step 811 is first considered. In step 811, the switch circuit 53 selects the absolute value $|\omega r|$ of the actual speed, and the selected result is converted to a digital signal by the A/D converter 54 in step 812. In step 813, the digital signal is input to the CPU 55 as the absolute value of the actual speed. In step 814, since the graph having a characteristic of the actual speed $\omega r$ with respect to the allowable value $\omega s'$ of the slip speed, as shown in FIG. 7, is prestored in the PROM, the allowable value $\omega s'$ corresponding to the actual speed $|\omega r|$ is determined.

In step 815, since the switch circuit 53 receives the slip speed $|\omega s|$ from the absolute value circuit 31, this value is converted to digital data by the A/D converter 54 in step 816, and the digital data is supplied to the CPU 55 in step 817.

The CPU 55 simultaneously receives the allowable value $\omega s'$ of the slip speed, and the absolute value $|\omega s|$ thereof, and compares these values in step 818.

If the allowable value $\omega s'$ of the slip speed is larger than or equal to the slip speed $|\omega s|$, a continue signal is output in step S819 and rotation of the induction motor is continued. Thus, the process goes to step 801. In step 801, an instructed speed $\omega c'$ is compared with a present speed $\omega_c$. If a coincidence is found therebetween, the flow jumps to step 810. If the instructed speed is larger than the current speed, the operations in steps 802, 803, and 804 are performed. If the instructed speed is smaller than the present speed, the operations in steps 805, 806, 807, 808, and 809 are performed, so that a frequency corresponding to the present rotation speed (rpm) is calculated, and the calculated result is output to the rate multiplier 4 (step 810). Contrary to this, if the slip speed $|\omega s|$ is larger than the allowable value $\omega s'$ of the slip speed, one of suppression signals is output in step 820, and is sent to the rate multiplier 4. In this manner, excessively quick acceleration and deceleration of the induction motor can be suppressed.

The operation in the second mode of the embodiment shown in FIG. 2, i.e., a case wherein the time interval plotted along the abscissa is variable, and a speed change per unit time output to the induction motor plotted along the ordinate is fixed, as shown in FIG. 4, will be described with reference to the flow charts of FIGS. 7 and 8. In step 705, an interval or duration of the interval interruption, for example, the number n of the interruptions to be carried out during the unit time of 1 ms is selected. When the interruptions are carried out n times per 1 ms, FIG. 8 shows a flow chart for 1/n ms interval interruption instead of 1 ms interval interruption. Further, the speed change $\Delta\omega_c$ shown in FIG. 8 is a fixed value, for example, 1 rpm. Other operations are the same as in mode 1.

In this manner, excessively quick acceleration and deceleration can be suppressed, and a stall state can also be prevented.

According to the present invention, excessively quick acceleration and deceleration can be suppressed, and the induction motor can be used as a servo motor.

What is claimed is:

1. A motion control apparatus for an induction motor comprising:

means for generating first serial pulses having a period according to an instructed speed of said induction motor and for outputting commands resulting in a change of a rotation position of said induction motor;

means for deriving the change in the rotation position of the induction motor and generating second serial pulse representing the change in the rotation position;

droop counter means for accumulating sums of the first serial pulses and the second serial pulses to continuously obtain a difference between an actual position and a desired motor position;

means for obtaining an actual speed of the induction motor based on an occurrence density of the second serial pulses;

means responsive to the actual speed for reading out from a table an allowable slip speed $|\omega_s'|$ predetermined in accordance with a characteristic of said induction motor;

means for generating a torque instruction signal on the basis of a difference between an output of said droop counter means and the actual speed;

means for continuously obtaining a slip speed $|\omega_s|$ by using the torque instruction signal, the actual speed and constants based on an equivalent circuit of said induction motor;

means for comparing the slip speed $|\omega_s|$ and the allowable slip speed $|\omega_s'|$ to control the generation of the first serial pulses such that when $|\omega_s'| \geq |\omega_s|$, the first serial pulses are generated in accordance with an inclination of an acceleration/deceleration curve of the rotation selected in advance, and, when $|\omega_s'| < |\omega_s|$, the first serial pulses are generated so as to decrease the inclination of the acceleration/deceleration curve, thereby to control the motion including increment or decrement of the number of rotations of said induction motor with respect to an unit time interval.

2. An apparatus according to claim 1, wherein the inclination of the acceleration/deceleration curve is limited in accordance with the value of the allowable angular frequency $\omega_s'$ while in the acceleration/deceleration curve, a unit time interval is set constant and a change in rotation speed per unit time interval is variable.

3. An apparatus according to claim 1 wherein the inclination of the acceleration/deceleration curve is limited in accordance with the value of the allowable angular frequency $\omega_s'$ while in acceleration/deceleration curve, a change in rotation speed per unit time interval is set constant and a unit time interval is variable.

* * * * *